United States Patent [19]

Griffiths

[11] Patent Number: 4,688,604
[45] Date of Patent: Aug. 25, 1987

[54] HOSE

[75] Inventor: Alan D. Griffiths, Binbrook, England

[73] Assignee: Dunlop Limited, Great Britain

[21] Appl. No.: 680,522

[22] Filed: Dec. 11, 1984

[30] Foreign Application Priority Data

Aug. 21, 1984 [GB] United Kingdom ............... 8421235

[51] Int. Cl.⁴ ............................................ F16L 11/08
[52] U.S. Cl. .................................. 138/129; 138/137; 138/DIG. 6
[58] Field of Search ............. 138/127, 130, 132, 133, 138/174, DIG. 6

[56] References Cited

U.S. PATENT DOCUMENTS 1,651,022 11/1927 Fulton ............................ 138/127 X

FOREIGN PATENT DOCUMENTS 833492 10/1938 France .
1423059 1/1976 United Kingdom .
1429104 3/1976 United Kingdom .
2105434A 3/1983 United Kingdom .

Primary Examiner—Stephen Marcus
Assistant Examiner—Mark Thronson
Attorney, Agent, or Firm—Stevens, Davis, Miller & Mosher

[57] ABSTRACT

A flexible hose suitable for the transportation of crude oil at elevated temperature and pressure comprises an assembly of a layer of polymeric material disposed between radially inner and radially outer support layers. The polymeric material is of a kind which normally would expand by at least 10% when exposed to the crude oil but which in the assembly is constrained against expansion by said inner and outer support layers.

9 Claims, 1 Drawing Figure

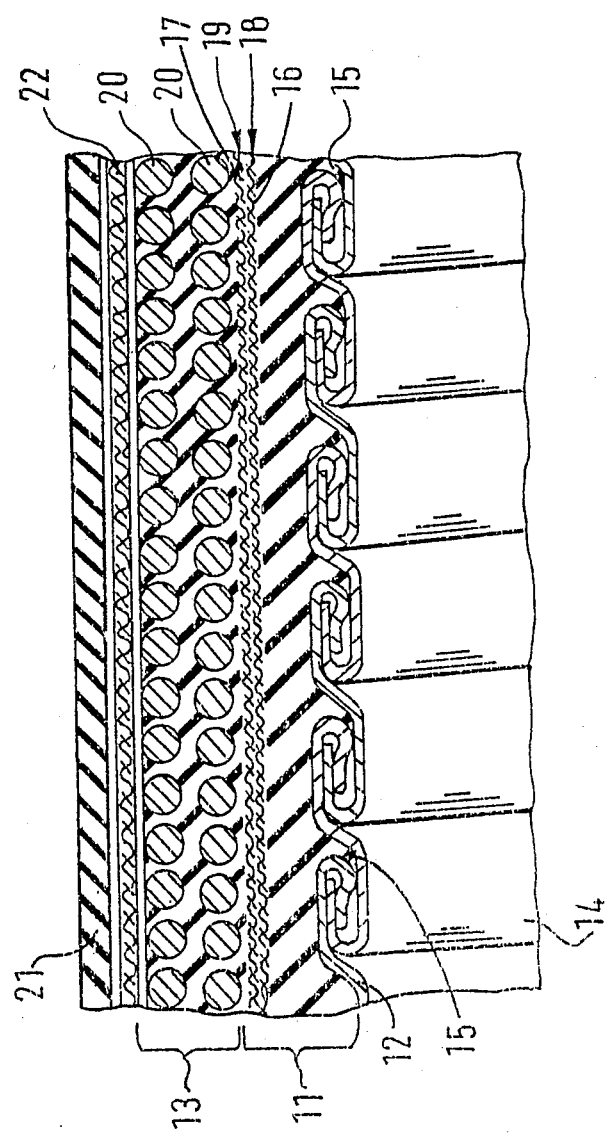

HOSE

This invention relates to flexible hose and in particular, though not exclusively, to flexible hose suitable for the transportation of corrosive fluids, such as crude oil, under a high pressure.

In the design of flexible hose it is known that certain polymeric materials which are able to withstand contact with corrosive fluids, such as crude oil containing hydrogen sulphide, are not suitable for use in hoses of a kind wherein there may be a sudden reduction of pressure in the bore of the hose. This arises because components of the transported fluid are absorbed under pressure by the polymeric material and if there is a sudden reduction of pressure within the bore of the hose the polymeric material is unable to withstand the pressure due to the absorbed fluid within the material. In consequence the polymeric material loses its integrity and does not continue to perform satisfactorily the functions, typically including that of fluid sealing, which it is intended to fulfil.

Because of the afore-described problem it is common to confine the choice of polymeric material for use in hose for the transportation of corrosive fluids to those materials which do not absorb a significant quantity of the transported fluid, but the choice of materials is thereby restricted and use cannot be made of certain materials which for reasons such as cost or performance otherwise would be selected.

The present invention seeks to overcome the afore-described difficulties by providing that in a hose containing a layer of polymeric material said layer is disposed between radially inner and radially outer support layers which serve to constrain expansion of the polymeric material, and the polymeric material is chosen to be of a kind which in the absence of constraint by the support layers of the hose would swell by at least 10% of its original volume when exposed to crude oil at ambient temperature and pressure for a period of seven days.

Preferably the polymeric material is of a kind which would expand in volume by at least 20%, and more preferably by at least 50% when initially exposed to crude oil at ambient temperature and pressure for seven days.

Accordingly, whilst normally it would be expected that use should be made of a polymeric material which does not swell significantly so as to minimise damage to the polymeric material layer in the event of rapid reduction of pressure in the bore of the hose, in accordance with the present invention it is required intentionally that there should be used, in a prescribed space between the inner and outer support layers, a polymeric material of a kind which exhibits a high degree of swelling on initial exposure to the transported fluid at least when the transported fluid is crude oil.

It is believed that by employing a material of a kind which exhibits a high degree of swelling there is achieved, after initial exposure to the transported fluid, a high degree of compression within the constrained polymeric material and that in consequence that fluid which has permeated to within the polymeric material is not able thereafter rapidly to expand or leak from the material in the event of a rapid reduction of pressure in the bore of the hose. Accordingly it is found that the integrity and useful fluid sealing properties of the polymeric material layer are not significantly impaired.

The radially outer support layer may be of a kind comprising at least one helically extending reinforcement element successive turns of which are spaced axially in the direction of the length of the hose. To assist in ensuring that the layer of polymeric material does not tend significantly to exude between these successive turns when caused to tend to swell by initial exposure to the transported fluid it is provided by a further aspect of the present invention that the layer of polymeric material shall incorporate, in a radially outer region thereof, at least one embedded layer of high tenacity textile material. The term "textile material" as used herein includes materials such as steel wire, wire cords and metallic cords of the kind used for the reinforcement of pneumatic tires.

By "high tenacity" is meant a material having a tenacity greater than 0.25 Newtons/tex. However where the material is rayon the tenacity should be greater than 0.3 Newtons/tex and where the material is polyester or nylon the tenacity should be greater than 0.5 Newtons/tex.

The layer of textile material may be formed from a woven fabric, a cord fabric (being a fabric in which parallel warp cords are held in relation to one another by light-weight weft yarns), or separate cords wound helically around the part formed hose or applied by braiding. In the case of separate cords, these may be embedded in a strip of rubber which then is wound around the hose.

The high tenacity textile material, at least when a woven or cord fabric, may be in the form of a strip which preferably is applied helically relative to the length of the hose.

Preferably the high tenacity textile material is a cellulosic material, for example rayon.

One embodiment of the present invention will now be described, by way of example, with reference to the accompanying diagrammatic drawing which is a longitudinal cross-sectional view of part of a hose in accordance with the present invention.

The hose comprises a liner assembly 11 including a polymeric material such as elastomeric polyacrylate disposed between a radially inner support layer 12 and a radially outer support assembly 13.

The inner support layer 12 is formed from a single double folded helically wound strip 14 arranged with successive turns thereof in interlocked relationship.

The interlocked strip 14 defines in the radially outer surface of the inner layer 12 a helically extending crevice 15. Preferably the strip and crevice are of a kind as described in more detail in the specification of our copending U.K. patent application No. 84/21238.

Extruded around the inner layer 12 in a manner so as to completely fill the crevice 15 is the polymeric liner layer 11 of elastomeric polyacrylate. This layer is formed by a two-stage extrusion process. In a first stage a substantial proportion of the overall thickness of the liner material is applied, then a plurality of high tenacity rayon yarns are wound helically around the part-formed liner layer. The rayon yarns are wound in such a manner as to form two layers, the yarns 16 in one layer 18 extending with a left-hand twist relative to the direction of the length of the hose and the yarns 17 of the other layer 19 extending with a right-hand twist relative to the direction of the length of the hose. Subsequent to winding of the yarns 16,17 a thin layer of elastomeric polyacrylate is extruded over the layers 18,19 which thereby are substantially wholly embedded in said material.

The elastomeric polyacrylate of which the liner layer 11 is formed would in the absence of external constraint swell by 35% when exposed to crude oil at ambient temperature and pressure for 7 days.

However, in the hose construction described herein swelling of the elastomeric polyacrylate is constrained by the afore-described inner layer 12 and the outer support assembly 13. The outer support assembly comprises, embedded in elastomeric material, two layers of high tensile reinforcement wire each comprising helically wound multi-filament wire cords 20 of outer diameter 6 mm, the cords of one layer extending relative to the length of the hose in an opposite sense to the cords of the other layer of the pair. The wires forming each cord 20 preferably are of an aluminium clad type such as is the subject of our co-pending U.K. patent application No. 84/21237. It is further preferred that the helically extending wires of each cord 20 extend relative to the length of the cord in a sense the same as the sense in which the respective cord extends relative to the length of the hose; that is, the wires of a cord which extends relative to the length of the hose with a right-hand twist preferably extend (with the exception of any core wire) with a right-hand twist relative to the length of that cord and conversely in the case of a left-hand twist cord.

External of the outer reinforcement assembly 13 there is provided a fabric breaker layer 22 and an abrasion resistant neoprene cover layer 21.

I claim:

1. A hose for the transportation of corrosive fluids under a high pressure comprising a layer of polymeric material of a kind which in the absence of constraint would swell by at least 10% of its original volume when exposed to crude oil at ambient termperature and pressure for a period of seven days, and radially inner and radially outer support layers between which said layer of polymeric material is disposed and arranged such that said support layers are able to constrain the tendency of the polymeric material to expand in consequence of being exposed to components of crude oil permeating through the inner support layer.

2. A hose according to claim 1 wherein said polymeric material is of a kind which will expand in volume by at least 20% when initially exposed to crude oil.

3. A hose according to claim 2 wherein said polymeric material is of a kind which will expand in volume by at least 35% when initially exposed to crude oil.

4. A hose according to claim 3 wherein there is incorporated in a radially outer region of the layer of polymeric material at least one embedded layer of high tenacity material.

5. A hose according to claim 1 wherein the radially outer support layer comprises at least one helically extending reinforcement element successive turns of which are spaced axially in the direction of the length of the hose.

6. A hose according to claim 4, including a high tenacity textile material, said high tenacity textile material being a cellulosic material, said cellulosic material being rayon.

7. A hose according to claim 1 wherein the layer of polymeric material comprises elastomeric polyacrylate.

8. A hose for the transportation of crude oil comprising a layer of polymeric material of a kind which in the absence of constraint would swell by at least 10% of its original volume when exposed to crude oil at ambient temperature and pressure for a period of seven days, radially inwards of said layer of polymeric material an inner support layer and radially outwards of said layer of polymeric material an outer support layer of a kind comprising at least one helically extending reinforcement element successive turns of which are spaced axially in the direction of the length of the hose, said inner and outer support layers being arranged to constrain the tendency of the polymeric material to expand when exposed to crude oil, and incorporated in a radially outer region of the layer of polymeric material at least one embedded layer of cellulosic material of a kind having a tenacity greater than 0.5 newtons/tex.

9. A hose according to claim 8 wherein the layer of polymeric material comprises elastomeric polyacrylate.

* * * * *